May 19, 1970 C. B. WALSH 3,512,732
MOTOR AND DRIVING SYSTEM
Filed Oct. 24, 1968
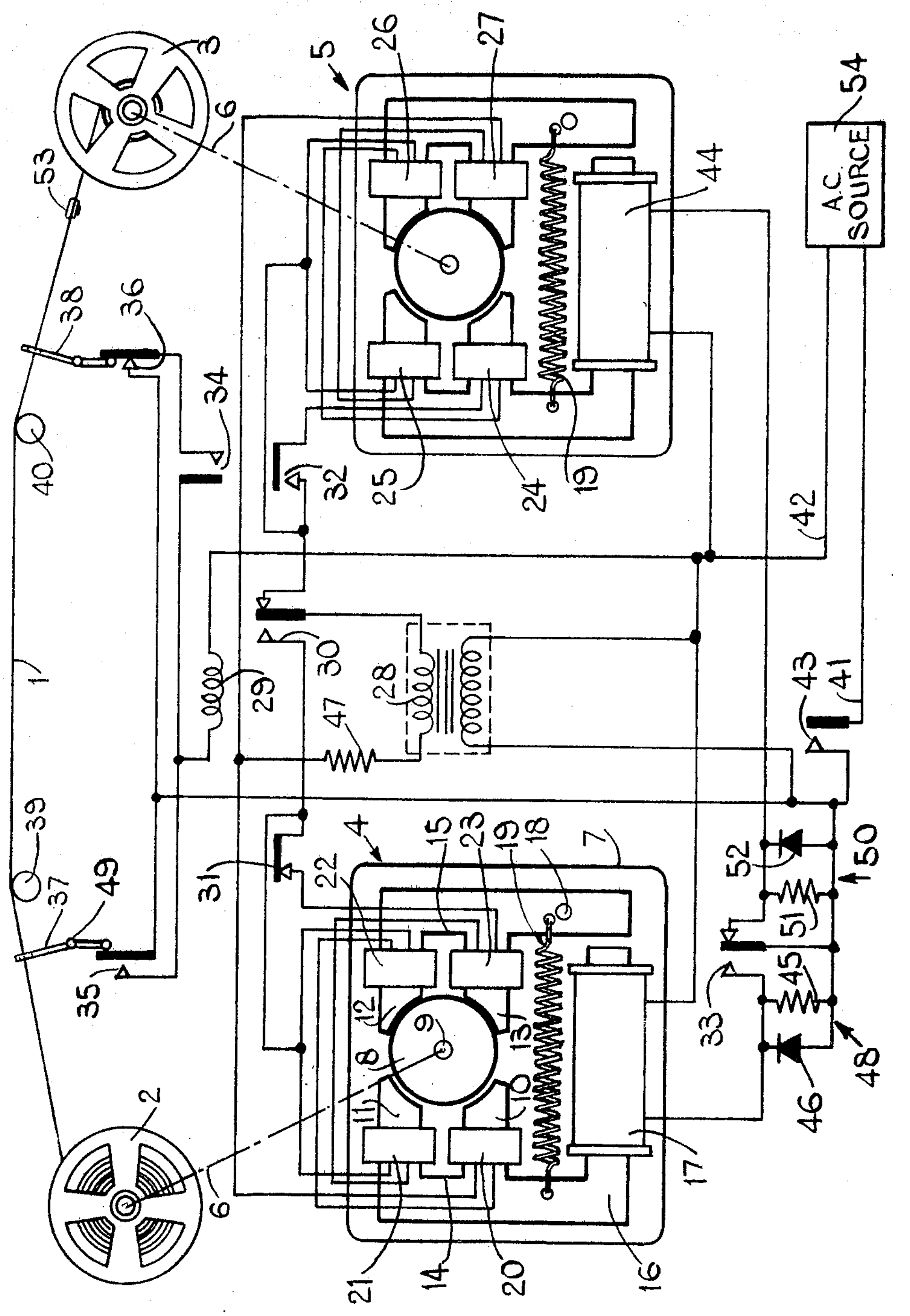
INVENTOR
Charles Bernard Walsh
BY Kane and Baxley
ATTORNEY

United States Patent Office 3,512,732

Patented May 19, 1970

3,512,732

MOTOR AND DRIVING SYSTEM

Charles Bernard Walsh, Hemingford Grey, England, assignor to International Computers Limited, London, England, a British company Filed Oct. 24, 1968, Ser. No. 770,168
Claims priority, application Great Britain, Aug. 30, 1968, 41,410/68
Int. Cl. B65h 75/02
U.S. Cl. 242—188 9 Claims

ABSTRACT OF THE DISCLOSURE

A shaded pole motor of modified construction is arranged in a circuit to provide enhanced torque by the substitution of boosted windings to replace the conventional shading windings, and the arrangement includes, instead of the conventional short-circuiting of a pair of shading windings, the energization of the boosted windings by alternating current concurrently with the energization of the normal field coil. In a tape or ribbon drive system two such motors are used, a first one to pay out the tape or ribbon from a first reel and a second to wind up the tape as it is paid out. By the use of normal shading windings and a series reactance in the field coil circuit, the first motor is ararnged to have an output torque lower than normal, while the second motor is arranged to have an enhanced torque so that the tape is maintained under tension while it is fed. Pole pieces of both motors are carried on a spring loaded limb of their respective armatures so that, on deenergization, the spring pole pieces act as brakes to maintain tape tension. Reversal of direction of tape feeding is accomplished by providing two diametrically opposed pairs of windings on the pole pieces of each motor, one pair being boosted windings and the other pair being normal shading windings. The winding arrangements of one motor are the inverse of those of the other motor, so that tape tension is maintained while the tape is fed in either direction.

BACKGROUND OF THE INVENTION

Field of the invention

The present invention relates to motors of the so-called shaded pole kind and in particular to the modification thereof to provide an enhanced torque output and to a motor drive system utilizing such modified motors particularly, but not exclusively, suitable for use in connection with the feeding of tape-like members, such as inked ribbons, for example, in printing devices.

Description of the prior art

Tape feeding apparatus has previously been proposed in which a tape is advanced from a supply to a take-up reel. The tape may be an information bearing tape, such as a magnetic recording tape or a perforated paper tape, and the feeding apparatus in such cases is frequently required to reverse the direction of feeding so that the tape is re-wound on to the supply spool either in order that the spool may be changed, or in order that a part of the tape may be scanned more than once by a transducing head arranged to extract information from or to write information on to the tape. A somewhat similar control of feeding a tape-like member is used in connection with impact printing devices in which an inked ribbon is fed across a type-carrying member or members, a printed record being produced by impressing a type member against a record with the ribbon interposed between the record and the member. Such printing devices frequently include means for advancing the ribbon from one reel to another and for reversing the direction of movement of the ribbon when it has passed almost completely from one of the reels. It has also been proposed, in the known devices, to use so-called shaded-pole motors to drive the reels. However, it is difficult, in using motors of this kind, to obtain a drive having a sufficiently high torque to allow a reasonable tension to be applied to the tape or ribbon without requiring a motor of disproportionately large size.

SUMMARY OF THE INVENTION

According to one aspect of the present invention apparatus for feeding a tape-like member includes at least one shaded pole motor having a rotor; four polepieces symmetrically arranged about the rotor, the polepieces being magnetically coupled in two adjacent pair respectively; a separate winding about each polepiece, the windings being electrically coupled into first and second diametrically opposed pairs respectively; a magnetic yoke between said two pairs of magnetically coupled polepieces; and a field coil magnetically coupled with the yoke; and means for energising the field coil with an alternating electric current and concurrently energising said first diametrically opposed pair of windings with an alternating electric current, said second diametrically opposed pair of windings being unenergised, to produce rotation of said rotor in a first direction at a higher torque.

Means may be provided for modifying the operation of the motor to produce rotation of the rotor in a second, opposite, direction at a different, lower, torque by disconnecting said first diametrically opposed pair of windings from the energising means and short-circuiting said second diametrically opposed pair of windings, the energisation of the field coil being maintained at a lower level.

The apparatus may include two such motors, the rotor of one motor being caused to rotate at said higher torque while the rotor of the second motor is caused to rotate at said lower torque, whereby a tape-like member is moved between reels respectively driven by the motors, the reel driven by the second motor then being effective to pay out and to maintain tension in the tape-like member as it is wound on the reel driven by the first motor.

The yokes of the motors may then be arranged to clamp their respective rotors on de-energisation of the field coil to maintain tension in the tape-like member while it is at rest, and in this case a limb of each yoke may be pivoted and spring-tensioned to urge the polepieces carried by that limb towards the rotor.

BRIEF DESCRIPTION OF THE DRAWING

The drawing shows, diagrammatically, a ribbon feeding system incorporating a pair of modified shaded pole motors.

DESCRIPTION OF THE PREFERRED EMBODIMENTS

Referring now to the drawing, an inked ribbon 1 is fed between a pair of reels 2 and 3 respectively. The reels 2 and 3 are driven by a pair of shaded pole motors 4 and 5 respectively, as indicated by broken lines 6. The motor 4 is supported on a backplate 7 and has a rotor 8 mounted on a spindle 9 carried in bearings (not shown) in the plate 7. Four polepieces 10, 11, 12 and 13 respectively, are arranged symmetrically about the rotor 8 and are formed at the ends of two limbs 14 and 15 of magnetic material. The arrangement is such that a first adjacent pair of polefaces 10 and 11 is formed at the end of one limb 14 and a second adjacent pair of polefaces 12 and 13 is formed at the end of the other limb 15, the limbs 14 and 15 being positioned on opposite sides of the rotor 8 and extending substantially parallel to one another in the same direction from the rotor 8. The limb 14 is formed on an L-shaped member which also has an arm 16 extending towards the free end of the limb 15, so that the limbs

14 and 15 together with the arm 16 form a yoke and provide a magnetic circuit coupling the adjacent pairs of polepieces, the polepieces of each adjacent pair being themselves magnetically coupled by the material of the limb 14 or 15 on which they are formed.

The limb 15 is pivoted on a pin 18 so that the pole pieces 12, 13 carried on this limb may be swung into or out of contact with the rotor 8, and a tension spring 19 is provided to urge the polepieces 12 and 13 into contact with the rotor 8. A field coil is provided on the arm 16 of the limb 14 and the pivot 18 allows the arm 15 to move, to swing the polepieces 12 and 13 away from the rotor 8 and at the same time to close the free end of the limb 15 towards the free end of the arm 16, upon energization of the field coil 17.

The polepieces 10, 11, 12 and 13 carry windings 20, 21, 22 and 23 respectively, one for each polepiece and these windings are electrically connected to form series pairs on diametrically opposed polepieces. Thus, the diametrically opposed windings 20 and 22 are connected in series, as are the windings 21 and 23. The windings 20 and 22 are identical as are the windings 21 and 23, but each of the windings 20, 22 has a greater number of turns than each of the windings 21, 23, the windings 21, 23 being the normal shading windings provided on a shaded pole motor of this kind. Thus the term "normal shading windings" will be used herein to denote windings of the kind employed for the windings 21, 23 while windings of the kind employed for the windings 20, 22 having a greater number of turns than is normal, will be referred to as "boosted" windings. It has been found that for the present application, with the same energising current applied to the windings, the preferred number of turns to be used in a boosted winding is approximately six times that of a normal shading winding.

The motor 5 is of substantially the same construction as that described in relation to the motor 4, but because in the present case the motor 5 is arranged to operate with its greatest torque output delivered while it is rotating in the opposite direction to the motor 4, the dispositions of the normal shading windings and the boosted windings are the inverse of those described in connection with the motor 4. Thus, as shown in the drawing, the diametrically opposed pair of windings 24 and 26 are normal shading windings in this case, while the pair of diametrically opposed windings 25 and 27 are boosted windings.

A transformer 28 provides a source of electrical energy for application to the polepiece windings of the motors, and a relay 29 has contacts 30 to 34 which control the application of energising current to these windings and to the field coils 17 of the motors in a manner to be described in detail with reference to the operation of the apparatus. The relay 29 is controlled by a pair of microswitches 35 and 36 respectively. The microswitches 35, 36 are actuated by arms 37 and 38 respectively. The arms 37 and 38 are provided in the path of the ribbon respectively between the reel 2 and a ribbon guide 39 and between the reel 3 and a ribbon guide 40. The arms 37 and 38 respectively each have forked ends through which the ribbon 1 pass and in the well-known manner are moved by rivets 53 carried near the ends of the ribbon as it moves from one reel to the other.

The operation of the apparatus will now be described, and it is assumed that initially the ribbon is to move from the reel 2 to the reel 3, and that the relay 29 is unoperated. A source of alternating current 54 is connected to a pair of input lines 41, 42 and the application of this current is controlled by a main switch 43. The switch 43 is closed manually so that the primary winding of the transformer 28 is connected to the input lines 41, 42. The field coil 44 of the right-hand motor 5, as shown in the drawing, is also connected through unoperated contact 33 of the relay 29 directly to the input lines 41, 42. The field coil 17 of the left-hand motor 4, as shown in the drawing, is connected through a series circuit 48 consisting of a parallel-connected resistor 45 and diode 46 to the input lines 41, 42. Energisation of the field coils of both motors causes the spring-loaded limbs 15 of both motors to pivot the pole pieces 12 and 13 away from the rotors 8.

The boosted windings 25 and 27 of the motor 5 are connected by unoperated contact 30 of the relay 29 to the secondary winding of the transformer 28 through a series resistor 47, while the normal shading windings of the same motor 5 are disconnected by unoperated contact 32 of the relay 29.

In the case of the left-hand motor 4, the secondary winding of the transformer 28 is disconnected by unoperated contact 30 of relay 29 from the pole piece windings 20 to 23, but the normal shading windings 21 and 23 are short-circuited by the unoperated contact 31 of the relay 29.

The application of electrical energy to the boosted windings of a motor results in a higher torque output than results from the conventional short-circuiting of the normal shading windings. Thus, the right-hand motor 5, on which the field coil 44 is fully energised concurrently with the energisation of the boosted windings 25 and 27, applies a high torque to turn the reel 3 in such a direction as to wind up the ribbon 1.

At the same time the motor 4 has its field coil 17 energised at a low level as determined by the series circuit 48 concurrently with the short-circuiting of its normal shading windings 21 and 23. In the absence of any external conditions the motor 4 would therefore turn in the same direction as the motor 5 but at a lower speed and with a much reduced torque as compared with the motor 5. Hence, the operation of the motor 4 in this manner in the present apparatus provides a substantially constant load to maintain the ribbon 1 under tension as it passes from the reel 2 to the reel 3. In a typical arrangement, using commercially available conventional shaded pole motors it was found that a motor energised in the manner described for the motor 5 ran under unloaded conditions at a speed of approximately 55 r.p.m. while a motor energised as described for the motor 4 ran under unloaded conditions at a speed approximating 10 r.p.m., the exact speed depending on the value of the series resistor in the field coil circuit. With both motors energized as described and coupled to ribbon-carrying reels under conditions where, as in the present case the normally faster motor took up ribbon paid out by the normally slower motor the resultant speed of both motors approximated 40 r.p.m.

As long as the main switch 43 is closed the motors 4 and 5 will continue to operate so that the ribbon passes from the left-hand reel 12 to the right-hand reel 3 as shown on the drawing. As the ribbon is fed to a point where it has almost all been unwound from the reel 2, a rivet, corresponding to rivet 53 carried at the left-hand end of the ribbon as shown in the drawing engages the left-hand forked arm 37 and causes it to move clockwise about a pivot 49 to close microswitch contact 35. Closure of this contact permits current to flow from the mainswitch 43, through contact 35 and the magnet coil of relay 29 to the return supply line 42 to operate the relay 29, which is an A.C.-responsive relay. Contact 34 of relay 29 closes and provides a hold circuit for the relay from the main switch 43, through normally closed microswitch contact 36, contact 34, and the magnet coil of relay 29, to maintain the relay 29 operated.

Upon operation of the relay 29, relay contact 30 changes over to disconnect the booster windings 25 and 27 of the motor 5 and to connect the booster windings 20 and 22 of the motor 4 to the secondary winding of the transformer 28 in series with the resistor 47. The contact 31 of relay 29 opens to disconnect the normal shading windings of the motor 4. The contact 32 of relay 29 closes to short-circuit the normal shading windings of the motor 5. Finally, the contact 33 of the relay 29 changes over to connect the field coil 17 of the motor 4 directly to the input supply lines 41 and 42 through the switch 43, leaving the field coil 44 of the motor 5 now connected in series with a circuit 50 consisting of a resistor 51 and a diode 52 connected in parallel.

Thus the result of the changes is that the condition of operation of the two motors are changed over and the motors both run in the opposite direction, feeding the ribbon from the reel 3 to the reel 2. The direction of feeding continues as long as the main switch 43 is closed until almost all the ribbon has been fed from the reel 3. At this point the rivet 53 carried by the ribbon from the reel 3 actuates the arm 38 to open the microswitch contact 36. The contact 36 opens the holding circuit for the relay 29, and since at this time the microswitch contact 35 has opened, the relay 29 is released. The release of the relay 29 restores all the contacts 30 to 34 to their unoperated states and the circuit is again rearranged in its initial state, to feed ribbon from the reel 2 towards the reel 3.

If at any time while the ribbon is being fed in either direction the main switch 43 is opened, the motor field coils will be de-energised and the pivoted limbs 15 will be moved by the tension springs 19 to bring one adjacent pair of polepieces on each motor, such as the polepieces 12 and 13 of motor 4, into contact with the rotor 8. The engagement of the polepieces with the rotor in this manner provides a brake to prevent further rotation of the reels 2 and 3, and thus maintains tension in the ribbon 1 while the apparatus is stationary. The opening of the main switch 43 also de-energises those windings on the polepieces of the motors that were energised. It is to be noted that the relay 29 will also be released if it had been operated immediately prior to the opening of the main switch 43. Thus, in this case, whenever the main switch is reclosed, feeding of the ribbon will always recommence in the direction from the reel 2 to the reel 3, because the relay 29 once released can only be be re-operated if the microswitch contacts 35 are closed. However, in the present apparatus this is of no consequence. It will be realised, however, that if it is required to maintain the direction of feeding of the ribbon in that direction in which it was being fed prior to switching off, then alternative arrangements are required to maintain the appropriate connections to the field coils and polepiece windings during the switch-off period. For example, a simple toggle-action contact settable to an alternative one of two states by the operation of the end-of-reel arrangements provides a suitable arrangement for controlling a relay, such as the relay 29, and, moreover, such a contact arrangement also avoids the necessity for a hold-on circuit for the relay 29.

It will be seen, therefore, that the arrangement described envisages a method of operating a shaded pole motor in a manner to produce an enhanced torque output by positively energising the shading windings instead of the conventional short-circuiting of such windings. A lower than normal torque output is obtained by the provision of a series reactive circuit in the field coil circuit in conjunction with the normal short-circuiting of shading windings. In a ribbon feeding arrangement using two shaded pole motors the ribbon is maintained under tension by enhancing the torque output of the motor driving that reel which is winding up the ribbon while the motor driving the reel from which ribbon is paid out has its output torque reduced from normal. Moreover, in such an arrangement the ribbon is maintained under tension even while stationary by the use of a pair of polepieces to act as a brake on each motor to prevent movement of the rotors of the motors throughout the period when energising current for the motors is cut off. It will be clear that this arrangement for feeding a ribbon is applicable to the feeding of other tape-like members, such as magnetic or paper tape, which may be required to be fed from one reel to another. By the use of a simple control circuit the operating conditions of the reel-driving motors may be reversed so that the tape-like members may be fed in either direction under similar conditions of maintained tension.

It is to be understood that although the use of a pair of driving motors has been described, one aspect of the present invention envisages the control of speed and torque of a conventional shaded pole motor by the provision and energisation of the boosted windings as described, thereby enabling the efficiency of such a motor to be enhanced and allowing the work output available from a shaded pole motor of a given size to be increased. In such a case, it will also be realised that the braking arrangement described is optional and the same output enhancement is available whether or not some of the polepieces are carried on a spring-loaded arm. Thus, all of the polepieces and the field coil may be carried on a U-shaped yoke.

I claim:

1. A drive system including at least one shaded pole motor having a rotor; four polepieces symmetrically arranged about the rotor, the polepieces being magnetically coupled in two adjacent pairs respectively; a separate winding about each polepiece, the windings being electrically coupled into first and second diametrically opposed pairs respectively; a magnetic yoke between said two pairs of magnetically coupled polepieces; and a field coil magnetically coupled to said yoke; the system further including means for energizing the field coil with an alternating electric current and concurrently energising said first diametrically opposed pair of windings with an alternating electric current, said second diametrically opposed pair of windings being unenergized, to produce rotation of said rotor in a first direction at a high torque.

2. A drive system as claimed in claim 1 including switching means operable between two states and effective in one state to connect a source of alternating current to energize said field coil and said first diametrically opposed pair of windings and to disconnect said second diametrically opposed pair of windings, said switching means being effective in the other state to disconnect said first diametrically opposed pair of windings from said source, to short circuit said second diametrically opposed pair of windings, and to switch a reactive circuit into series connection between said source and said field coil, whereby operation of said switching means to said other state produces rotation of said rotor in a second direction opposite to said first direction at a lower torque.

3. A drive system as claimed in claim 2 in which said first diametrically opposed pair of windings are each formed with a greater number of turns of wire than the individual windings of said second diametrically opposed pair.

4. A drive system, as claimed in claim 2, for feeding a tape-like member, including first and second motors each having a rotor; a pair of reels respectively driven each by a different one of the rotors; a tape-like member having two ends, the ends being respectively secured each to a different one of said reels; and a control device having first and second operative modes and including said switching means for each motor, the control device in the first operative mode being arranged to render said switching means for the first motor effective in said other state to produce rotation of the rotor of said first motor to cause the associated reel to pay out said tape-like member of said lower torque and to render said switching means for the second motor effective in said one state to produce rotation of the rotor of said second motor to cause the associated reel to wind up at said high torque the tape-like member as it is paid out, and the control device in the second operative mode being arranged to reverse the effective states of said switching means to reverse the direction of feeding of the tape-like member.

5. A drive system as claimed in claim 4 in which the control device includes detecting means operable after a predetermined length of the tape-like member has been paid out from a reel, and means responsive to operation of said detecting means for reversing the effective states of said switching means.

6. A drive system as claimed in claim 5 including an indicium carried near each end of the tape-like member and an indicium detecting station adjacent each reel.

7. A drive system as claimed in claim 6 in which the control device includes an electric contact arrangement switchable in response to the detection of an indicium at a detecting station to select the direction of feeding of the tape-like member towards that reel adjacent that station at which the indicium was sensed.

8. A drive system as claimed in claim 4 in which each motor includes braking means normally engageable to prevent rotation of the rotor, and in which the braking means is released from the rotor in response to energization of the field coil of the motor.

9. A drive system as claimed in claim 8 in which the yoke of each motor includes a movable limb, one of said adjacent pairs of polepieces being carried by said moveable limb, and in which each motor further includes a spring arranged to urge the polepieces carried by said moveable limb into braking contact with the rotor, the limb being moveable in response to energization of said field coil to move said polepieces away from the rotor.

References Cited

UNITED STATES PATENTS

| | | | |
|---|---|---|---|
| 2,577,190 | 12/1951 | Hare | 318—70 |
| 2,657,870 | 11/1953 | Pettus | 242—55.12 |
| 2,946,941 | 7/1960 | Jin | 318—223 |
| 3,158,769 | 11/1964 | Morrill | 310—172 |
| 3,293,522 | 12/1966 | Lewis | 318—327 |

LEONARD D. CHRISTIAN, Primary Examiner

U.S. Cl. X.R.

310—172; 318—223